3,227,648
METHOD OF CONTROLLING NOXIOUS ODORS IN SEWAGE
John Wilfred Hahn, San Antonio, and Sam B. Cresap, Fort Worth, Tex., assignors to Hahn Products, Inc., San Antonio, Tex., a corporation of Texas
No Drawing. Filed Sept. 20, 1963, Ser. No. 310,481
7 Claims. (Cl. 210—2)

This invention relates to a method of suppressing or controlling the formation of noxious odors in sewage. More particularly, the invention relates to the production and use of a novel additive in sewer systems, portable toilets and like, which additive is admixed with the sewage at a point in time prior to any substantial putrefaction of the sewage to thereby prevent or control the formation of noxious odors which are typically characteristic of and produced by putrefying sewage.

In the processing and treating of sewage, a number of steps are employed in the handling thereof so that the sewage may be efficiently and safely disposed of during the course of treatment. Generally speaking, it is the organic waste materials in the liquid sewage which are decomposed during the handling and treating thereof. Initially fresh or raw sewage will be acted upon by aerobic bacteria until the oxygen supply in the liquid portion has been reduced or substantially eliminated. At this point decomposition will be continued by the action of anaerobic bacteria, which action may be referred to herein as the putrifaction stage or septic condition of decomposition and the one which typically produces the noxious odors referred to above.

Many methods have been developed in an attempt to suppress these noxious odors but none have been as successful as the instant invention for various reasons. Some of these prior art methods have either attempted to mask the odors produced (which masking will sometimes herein be referred to as deodorizing) or have attempted to adjust the sewage treatment process, which, in many cases, resulted in health hazards, poor volume of treatment, and the like. Some odor suppressing materials, such as chlorine, also destroy the helpful bacteria necessary for the operation of the sewage treatment process, and hence are not fully satisfactory. Thus, there has been no practical and satisfactory method of controlling and suppressing odor prior to the instant invention.

It is, therefore an object of the present invention to provide an improved method of suppressing noxious odors in sewage by admixing therewith a novel additive which suppresses the development of the aforesaid odors.

It is a further object of this invention to provide a method of treating sewage in a continuous collecting and treating operation wherein a novel additive is introduced into the collection system near tertiary points in the collecting system.

Another object of the invention is to provide a novel method of suppressing the formation of noxious odors in portable toilets wherein an additive is introduced into a receiving fluid prior to any deposition therein of raw sewage.

These and other objectives will be obvious to those having ordinary skill in the art by reference to the description herein.

Briefly stated, the invention is for a method of suppressing odors in substantially non-putrified sewage or sewage that is substantially aseptic comprising the steps of first producing a novel additive, which additive is the result of a fermentation process utilizing excreta from lactating ruminants. Generally speaking, the additive produced for use in the instant invention follows certain of the teachings as set forth in United States Patent 2,908,113, issued to James Francis Martin on August 13, 1959, which patent describes a method for producing a soil conditioning agent. The additive of the present invention is produced by a method which has certain improvements and refinements thereover and which are not taught in the Martin patent. In addition to the improvements and modifications over the Martin patent, the applicants herein have also discovered a novel method of applying the additive in a manner to suppress the formation of noxious odors, which method provides end results which were wholly unobvious and unexpected to those skilled in the art.

The additive of the instant invention is generally produced by admixing excreta from lactating ruminants such as milking cows, with water in a digester chamber. This admixture is allowed to digest under specified conditions which will be enumerated hereafter until certain turning actions in the digestive process occur whereby a supernatant fluid (which fluid will hereinafter sometimes be referred to as a supernate) is produced. The exact chemical and/or biologic contents of this supernate is not fully understood or comprehended at the present state of the art. In any event, the supernate is withdrawn from the aforesaid digestive system and diluted with a quantity of water in specified ratios to produce the novel odor inhibiting additive. This additive is then introduced into sewage which has not as yet undergone any substantial amount of putrefaction or is in a substantially aseptic condition, as described above.

In describing the present invention, one preferred embodiment of the details of the digestion system will first be described, followed at a later point by teaching of certain alternatives thereof. There will then follow a description of various methods for using the additive for the intended purpose and setting forth the manners in which it may be introduced into the sewage.

Production of additive

In one method of producing the additive, an admixture is made of about 90 parts fresh water, 5 parts sea water and 5 parts of excreta (including fecal material and urine) from lactating ruminants such as milk cows. This admixture is allowed to stand for a period of time ranging from a few days to several days such as from 7 to 45 days at a suitable temperature, generally within the range of 65 to 96° F. The container in which the foregoing admixture is contained will be referred to as the digestion chamber or digester.

During the digestive process there will be a production of gas in the admixture which will cause a turning action which occurs when the solid particles of the excreta which are normally at rest on the bottom of the digester have absorbed gases in sufficient quantity to render them lighter than the fluid medium in which they are submersed, which causes them to rise to the top of the digester "en masse." This upheaval of solids is referred to as "turning" and may occur more than once during each day of operation.

After the digester has effected one or more turns, the regular production of supernate material can be started, wherein the clear brown supernate can be withdrawn daily and the digester re-supplied with a quantity of excreta and water.

During the production of the supernate certain steps and techniques are advisable to assure that the digestion action continues uninterruptedly. The objective of the digester process is to produce a supernate which has certain biological life and/or materials therein, which supernate can thereafter be diluted with water to make the above referred to additive. Hence, it is important that the digester be properly cared for so that the supernate may be withdrawn on a regular and continuing basis so as to provide a continued and ready supply of additive.

After the aforesaid turning action, if the admixture is allowed to stand, the risen solids will eventually give up some of their gas and once more sink to the bottom of the digester. The proper care of the digester requires that the solids be removed from the top of the digester after a turn at least once a day, even though turning may occur several times daily. These solids may be removed from the top of the digester following a turning action by skimming or other suitable mechanically convenient means.

After the floating solids have been removed from the top of the digester there will still remain some suspended particles in the admixture which are too small for skimming and/or other removal at that time and will sink to the bottom within a very short period of time such as 30 minutes, for example, leaving the supernate in the upper portion of the digester, which supernate will be relatively clear and odorless and of a light amber color. This supernate is then withdrawn from the digester by gravity flow, pumps or the like in daily quantities within the range of about 10% to 50% of the capacity of the digester.

After removal of the supernate the digester is again filled to the original level with additional quantities of water and excreta from milking cows (or other lactating ruminants) in the range of about 1 part excreta to 20 parts water.

The newly added excreta will sink to the bottom of the digester and the digestion process will proceed as described above so that supernate may be withdrawn daily with subsequent daily additions of new material.

As time passes an accumulation of finely divided particle material, usually brown in color, will accumulate in suspension in the supernate. In order to maintain satisfactory color requirements, this material must be removed by sieving between turns. This sieving operation should be performed without disturbing the accumulation of heavier material which occurs in the bottom of the digester, which material will generally be referred to as bottom material. It is desirable to maintain the level of the bottom material at a near constant level ranging from about $1/10$ to $1/20$ of the height of the digester.

The addition of new excreta and water (which will generally be referred to as feeding of the digester) and the removal of the supernate, as described above, are so regulated that there will be a nearly constant standard in certain respects. For example, it is desirable to maintain a uniform turning rate which is affected by both the nature of the feeding and the temperature at which the digester is maintained. It is desirable to maintain the suspended fines at a low level in the supernate. The color of the supernate should be preferably of an amber or beer color. It is desirable to maintain the pH value in the range of about 7.2 to 7.6. The bottom material should be maintained at a rather constant level and the biological oxygen demand (BOD) in the supernate should likewise be maintained at a constant rate. Generally speaking, the supernate will not have a fecal odor but may have a slightly hydrogen sulphide odor which is scarcely noticeable.

The foregoing generally describes one preferred method of producing the supernate. In order to arrive at the end product or the additive it is necessary to dilute the supernate with water in the ratio of about 1 to 2 parts supernate to 1 to 100 parts water. This solution is then allowed to stand or propagate for a period of several days, preferably more than 4 days at a temperature between about 10° C. and 37° C. At the end of this holding period the resulting product is an odor controlling additive which is then ready for addition to the sewage.

Sewage treatment generally

The primary objective of sewage treatment is to remove the biologically digestible or decomposable waste from the sewage; reduce the bacterial count, removing or killing the pathogenic organisms, and thereby purify the effluent to such a degree that it may be disposed of without danger to the community as a source of pollution.

Solid waste may be removed by screening, sedimentation, digestion and chemical precipitation and collection. Soluble organic waste may be removed by chemical precipitation or it may be reduced by chemical treatment or natural biological digestion.

In general, sewage treatment involves screening to remove large insoluble masses with collection of these and disposal; sedimentation to remove finely divided suspended solids with collection and digestion of this material, as sludge, in large digestion chambers under anaerobic conditions. This primary treatment may be followed by direct disposal of the effluent where conditions prevail to permit dilution or irrigation. More generally, the primary treatment (sedimentation) is followed by a secondary treatment to further reduce the very finely divided suspended (colloidal) and soluble material by digestion or chemical treatment. Such secondary treatment may be accomplished by the use of sand filters, contact beds, trickling filters and so on. Various combinations of these primary and secondary methods are used or, in some instances, the sewage is treated by a process combining the elements of primary and secondary treatment in a single stage. Greater efficiency and greater economy for the treatment of large quantities of sewage is achieved generally in two stage operations involving (A) primary sedimentation followed by (B) secondary treatment.

The more modern systems are usually one of two general types using (1) trickling filter beds for secondary treatment or (2) activated sludge treatment.

In the first named system a filter bed of loose stone of appropriate size covered with a slime of many kinds of micro-organisms is used to filter out suspended solids and digest these as well as dissolved organic materials. In the activated sludge treatment effluent from the primary settling tank or screened raw sewage is inoculated with sludge containing certain species of active-digestive bacteria which cause the finely divided and colloidal solids to collect together rendering them more settleable and which also promotes the digestion of dissolved organic materials. Some portion of the activated sludge is continuously fed back to the primary effluent or screened raw sewage to maintain the treatment. This treatment is accompanied by thorough aeration to promote aerobic digestion and agglutination of the fine particles.

In both of these processes the sewage is moved through the sewage system continuously to prevent the static collection of digestible material and keep to a minimum the development of a septic or anaerobic condition. Anaerobic digestion is accompanied by the production of foul smelling compounds and compounds which interfere with the desirable digestive processes aimed for in these methods.

The accumulated sedimented solids or sludge is generally subjected to further digestion separately by anaerobic processes before drying and disposal in the solid form.

Application of additive to sewage system

As indicated above, if the sewage is not provided with additional oxygen, the oxygen supply therein will be exhausted with the usual result that anaerobic bacteria will then set in to decompose the sewage and thereby produce the noxious odor and gases which are so disagreeable to the sensory nerves. The point at which this type of decomposition occurs in the sewage may be referred to as the septic condition or the purified stage.

It has been discovered that by introducing the aforesaid additive into the sewage prior to the sewage becoming substantially anaerobic or septic prevents the formation of or otherwise neutralizes the formation of these noxious odors. The septic condition may be said to exist subsequent to any substantial putrification of the sewage.

Because much of the odor generated in a continuously operated sewage disposal plant is formed as a result of the sewage becoming septic or partially septic by the time it reaches the plant, it has been found practical and desirable in one embodiment of the invention to introduce the additive into the sewer network in a continuous operation prior to the arrival of the sewage at the plant and preferably near tertiary points in the collection system. By tertiary points is meant three points located some distance from the sewage plant; for example, near the originating points of each of three lines leading to the sewage treatment plant. In this way the foul-smelling materials are neutralized and/or otherwise prevented as they are formed. Hence, the additive is uniformly and continuously introduced into the sewage at the rate of 10 to 1,000 p.p.m. at the aforesaid tertiary points.

In those instances where the collecting system is such that there is substantially no putrefaction of the sewage prior to its arrival at the wet well of the plant, then, in that event, the additive can be introduced into the sewage at the wet well. The quantity of additive to be introduced into the sewage is controlled such that the odors are not inhibited in the anaerobic digester of the sewage treatment system, but is effective in quelling or inhibiting odor production in other parts of the system such as the trickling filters, sedimentation tanks, aeration tanks, deep well and the like.

The supernate may be admixed with water in a continuous process through a series of baffled chambers, such that the end product will have the desired ratio of supernate to water and will have been held sufficiently long to properly incubate or propagate the additive.

For example, 100 gallons of supernate may be flowed daily into an additive tank along with a flow of 2,000 gallons of water per day. In this instance, the additive tank would have a capacity of approximately 4,000 gallons and connected at its bottom to the bottom of another 4,000 gallon tank which in turn is connected at its top to the top of a third 4,000 gallon tank. The third tank would be provided with an outlet into the sewer line. Hence, the time required for the supernate and water to flow through the 3 tanks to the sewer provides the necessary admixing and holding necessary to properly prepare the additive for entry into the sewage. There would thus be an overflow into the sewage line at the rate of approximately 2100 gallons per day. This rate of flowage could be either increased or decreased as the need arises so that the rate of additive introduction into the sewage will be at the rate of about 10 p.p.m to 1,000 p.p.m.

Application of additive to portable toilets

The applicants have also applied the foregoing teachings to reduce or suppress the development of noxious odors in portable toilets, such as those that are commonly used at construction sites, public gatherings, and the like. It has been discovered that if the well of such a portable toilet is provided with a mixture of about 1 quart of the aforesaid additive and 10 gallons of the receiving water (i.e., a ratio of about 1 part additive to about 40 parts water) before there is any deposition of raw sewage therein, noxious odors will be suppressed for extended periods of up to several days. In this usage, it is again important that the additive be placed in the well prior to the sewage developing the above referred to substantially septic condition.

Various ratios of the mixture of additive and water can be used, depending, of course, upon the amount of usage of the toilet, and the length of period between charges of the water in the well thereof. The term portable toilets will be understood to include not only toilets which are physically movable, but also toilets which have removable and/or replaceable wells for receiving sewage and which may be filled with the portions of additive and water before sewage is deposited therein.

Alternate methods of preparing supernate

While the preferred form of initially preparing the supernate in the digester chamber contemplates the use of a certain amount of sea water it has been found that while sea water does perhaps speed up the turning action and insure the continued production of supernate under conditions other than ideal, it has been discovered that sea water is not necessary when other conditions are maintained at or near optimum levels. Accordingly, additional methods for initiating digestion in the preparation of supernate will be set forth with various ranges of proportions of various ingredients which are operable at a standard temperature of 75° F. It is to be understood however, that generally the temperature range for carrying out the production of the supernate will be from about 55 to 105° F.

(1) One method of initiating digestion in preparation of supernate as previously taught, includes the use of sea water as explained in great detail above. It has been found that the proportions of ingredients may vary from about 1 to 10 parts sea water, about 65 to 95 parts by volume of water, and about 3 to 25 parts by volume of excreta from lactating ruminants. As given in the main example above, the optimum proportions are thought to be about 5 parts sea water, 90 parts fresh water, and 5 parts excreta from lactating ruminants such as milking cows, milking goats and the like.

(2) When no sea water is used, the digester may be initially filled with from about 75 to 97 parts by volume of fresh water and 3 to 25 parts by volume of excreta from lactating ruminants. An optimum range of ingredients in this instance would approximate 95% water and 5% excreta. Since no sea water is being used, greater care must be taken in following the above prescribed steps in caring for the digester. For example, care should be taken in properly screening the mixture daily to remove the undesirable particles. The feeding should be adjusted to maintain the near optimum standard conditions, also specified above. In this instance it may take a slightly longer time for the digester to produce supernate of the desired quality than is the case without sea water. Nevertheless, with care and proper treatment successful digestion operation may be continued with these initial ingredients.

(3) The digestion operation can be initiated also by various additional back steps wherein either a portion of the supernate or a portion of the additive is added back into a chamber containing the initial ingredients. For example, an admixture may be made of 48 parts by volume of supernate, 47 parts by volume of fresh water and 5 parts by volume of excreta. If the additive is to be added back, then the digester can be started, for example, with 95 parts of additive and 5 parts excreta. In these instances it is believed that the supernate and/or additive acts as the initial culture medium to provide fast and effective results in reaching the production cycle for the supernate.

Supernate digester operation

In order to insure continuous production of supernate and to insure that the digester operation does not go "dead" it is important to control the feeding rates. For example, with a digester having a capacity of 1,000 gallons there may easily be a withdrawal of 100 gallons of supernate every 24 hours. The feeding of the digester with fresh excreta and water should be maintained at such a rate that the digester will turn at least once daily. Since digestion and the turning rate are affected by temperature, the temperature should be maintained above 55° F. for turning to occur once daily. Once the digester operation is started a typical feeding might include the addition of 1 part excreta and 99 parts water to maintain a turning rate of 4 times daily, at 65° F. temperature.

If either the temperature or the proportion of excreta is increased the turning rate likewise increases. For example, with 1 part excreta and 99 parts water as the feed, and at 75° F., the turning rate may be 7 times daily. When the feed is 2 parts excreta and 98 parts fresh water and the temperature is maintained at 95° F., a turning may occur as often as 14 times daily. Thus it is obvious that there are many variable factors which can be adjusted to obtain the desired results.

A very typical digester operation might include the use of a digester with a capacity of 1,000 gallons. When the digester is operated properly there may be a daily withdrawal of 300 gallons of supernate. The daily feed would include the addition of 2 gallons of excreta and 298 gallons of fresh water with the temperature maintained at about 80° F. Under these conditions the following values would be approximated:

| | |
|---|---|
| Suspended solids in supernate | 75 mg./l. |
| Settleable solids in supernate | 0.4 ml./l. |
| Color | Amber. |
| pH | 7.4. |
| Supernate BOD | 50 p.p.m. |
| Bottoms level in digester | 3% of height of tank. |
| Settleable solids in digester | 30 ml./l. |

*Preparation of additive from supernate*

A typical example of preparing the additive would be to admix 1 part supernate with 19 parts fresh water and allow this admixture to stand for 4 days at 75° F. The resulting product would then have the following approximate values:

| | |
|---|---|
| pH | 7.6. |
| Total alkalinity | 125 meq./l. |
| Dissolved oxygen | 8.0 p.p.m. |
| Suspended solids | 2.0 mg./l. |
| BOD (biological oxygen demand) | 1.0 p.p.m. |
| Color | Colorless. |
| Odor | None. |

*Further advantages*

While the chief advantage of the invention as above decribed is for the suppression and control of noxious odors, there are certain other ancillary benefits derived from the described method. There is evidence indicating that the use of the additive in sewage as described above also improves the efficiency of the digestive process of the sewage decomposition in the sewage plant. For example, one sewage plant, which received sewage treated according to the method of this invention, had an initial capacity of approximately 1,000,000 gallons per day. During one period of operation utilizing the method of this invention, the plant load was increased to approximately 1,500,000 gallons per day with satisfactory results. The plant odor prior to the use of the method of this invention was very offensive, and during a 10 week treatment period utilizing the inventive method, odor was negligible. The percentage reduction of BOD prior to the treatment period was 60% and during treatment reached 78%.

At the present state of the art, the exact chemical and/or biological changes which occur in producing the supernate and the additive are not fully understood. Neither is the action on the sewage fully comprehended. However, it is well established that if the foregoing methods and procedures are followed, the desired end results will be obtained.

Other modifications may be made in the invention as particularly described without departing from the scope of the invention. Accordingly, the foregoing description is to be construed illustratively only and is not to be construed as a limitation upon the invention as defined in the following claims.

What is claimed is:

1. The method of suppressing noxious odors in sewage comprising the steps of:
   admixing excreta from lactating ruminants with water in a digester chamber,
   allowing said admixture to digest until a turn occurs and a supernate is produced,
   withdrawing a portion of said supernate from said digester,
   diluting said withdrawn supernate with water to produce an odor inhibiting additive, and
   adding said additive to raw sewage while said sewage is in a substantially aseptic condition.

2. The method of controlling offensive odors in a sewage collection and treating system comprising the steps of:
   admixing excreta from lactating ruminants with water in a digester chamber,
   allowing said admixture to digest until a turn occurs and a supernate is produced,
   withdrawing a portion of said supernate from said digester,
   diluting said withdrawn supernate with water to produce an odor suppressing additive,
   allowing said additive to propagate for a period of several days, and
   adding said additive to tertiary points in a sewage collection system in a substantially continuous and uniform rate of flow.

3. The method of controlling noxious odors in portable toilets comprising the steps of:
   admixing excreta from lactating ruminants with water in a digester chamber,
   allowing said admixture to digest until a turn occurs and a supernate is produced,
   withdrawing a portion of said supernate from said digester,
   diluting said withdrawn supernate with water to produce an odor suppressing additive, and
   allowing said additive to propagate for a period of several days,
   admixing said additive with the receiving water of the portable toilet in the range of about 1 part additive to about 40 parts water.

4. The method of suppressing noxious odors in a continuously operating sewage collection and treating system comprising the steps of:
   forming an admixture comprising excreta from milking cows and water in a digester chamber,
   allowing said admixture to digest until a turning operation starts and a supernate is produced,
   withdrawing a portion of said supernate from said chamber,
   diluting said supernate with water in the ratio of about 1 to 2 parts supernate and 1 to 100 parts water to produce an odor suppressing additive,
   allowing said additive to propagate for a period of from about 2 to 6 days, and
   substantially, continuously and uniformly introducing said additive in to the sewage treating system at a point where the sewage is still in a substantially aseptic condition.

5. The method of suppressing noxious odors in a continuously operating sewage collection and treating system comprising the steps of:
   forming an admixture comprising excreta from milking cows and water in a digester chamber in the ratio of about 3 to 25 parts excreta and 65 to 97 parts water,
   allowing said admixture to digest until a turning operation starts and a supernate is produced,
   withdrawing a portion of said supernate from said chamber,
   diluting said withdrawn supernate with water in the ratio of about 1 to 2 parts supernate and 1 to 100 parts water to produce an odor suppressing additive, allowing said additive to propagate at least about 2 days, and continuously introducing said additive into a sewage collection system at the rate of about 10 to 1,000 p.p.m. in the sewage.

6. The method of suppressing noxious odors in a continuously operating sewage collection and treating system comprising the steps of:

forming an admixture comprising about 3 to 25 parts excreta from lactating ruminants and about 65 to 97 parts water, allowing said admixture to digest in a digester chamber for a period of several days and until a turning action starts, at least about once a day removing the floating particles that rise during one of said turning actions, withdrawing a quantity of supernate from said chamber, diluting said withdrawn supernate with water in the ratio of about 1 to 2 parts supernate and 1 to 100 parts water to produce an odor suppressing additive, allowing said additive to propagate for at least about 2 days, continuously introducing said additive into a sewage collection system at a rate of about 10 to 1,000 p.p.m. in the sewage at a point where the sewage is still in a substantially aseptic condition.

7. The method of suppressing noxious odors in a portable toilet comprising the steps of:

forming an admixture comprising about 3 to 25 parts excreta from lactating ruminants and about 65 to 97 parts water, allowing said admixture to digest in a digester chamber for a period of several days and until a turning action starts, at least about once a day removing the floating particles that rise during each said turning action, withdrawing a quantity of supernatant fluid from said chamber after one of said turns, diluting said withdrawn supernatant fluid with fresh water in the ratio of about 1 to 2 parts fluid and 1 to 100 parts water to produce an odor suppressing additive, allowing said additive to propagate for at least about 2 days, admixing said additive with fresh water in the ratio of about 1 part additive to about 40 parts water to produce a receiving fluid, depositing a quantity of said receiving fluid in the receiving well of said portable toilet prior to the deposition therein of raw sewage.

References Cited by the Examiner

UNITED STATES PATENTS 2,908,113  10/1959  Martin _____ 47—58

OTHER REFERENCES

Fuller: Can. Eng., vol. 38, pp. 367–368, also cited in Chem. Abst. 13, 3263.

MORRIS O. WOLK, *Primary Examiner.*